United States Patent [19]
Neumann et al.

[11] Patent Number: 5,185,382
[45] Date of Patent: Feb. 9, 1993

[54] STARCH-BASED, BIODEGRADABLE PACKING FILLER AND METHOD OF PREPARING SAME

[75] Inventors: Paul E. Neumann; Paul A. Seib, both of Manhattan, Kans.

[73] Assignee: Kansas State University Research Foundation, Manhattan, Kans.

[21] Appl. No.: 932,938

[22] Filed: Aug. 21, 1992

Related U.S. Application Data

[62] Division of Ser. No. 822,885, Jan. 21, 1992.

[51] Int. Cl.$^5$ ............................. C08J 3/02; C08J 9/12
[52] U.S. Cl. .................................. 521/84.1; 106/122; 106/210; 106/213; 264/53; 264/186; 521/82; 521/88
[58] Field of Search .................... 521/84.1, 79, 82, 88; 264/53, 186; 106/122, 210, 213

[56] References Cited
U.S. PATENT DOCUMENTS
3,962,155 6/1976 Usamoto et al. .................. 521/84.1

Primary Examiner—Morton Foelak
Attorney, Agent, or Firm—Hovey, Williams, Timmons & Collins

[57] ABSTRACT

Starch-based biodegradable packaging fillers are provided which have high volumes, low weights, and excellent compressibility and resiliency properties. The products of the invention are fabricated by extrusion of a starch substrate, most preferably normal wheat starch, in the presence of minor amounts of a polyalkylene glycol or derivative thereof and/or a particulate bubble-nucleating agent. Effective biodegradable packaging fillers can thus be fabricated without the use of expensive modified starch substrates; however, such substrates can also be employed if desired, and the additives of the invention improve these products as well. In preferred production procedures, the additives are mixed with the starch substrate, and the mixture is preconditioned and then extruded through a twin screw extruder.

23 Claims, 6 Drawing Sheets

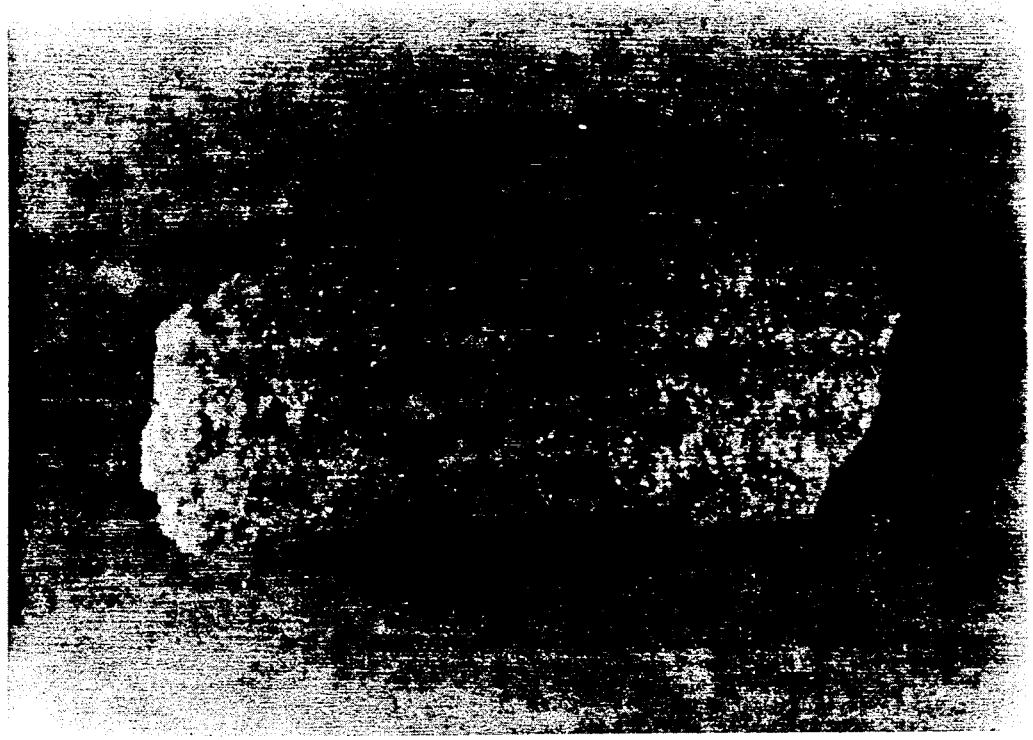
0.5% Sipernat 22    FIG. 1.    3.0% PEGC
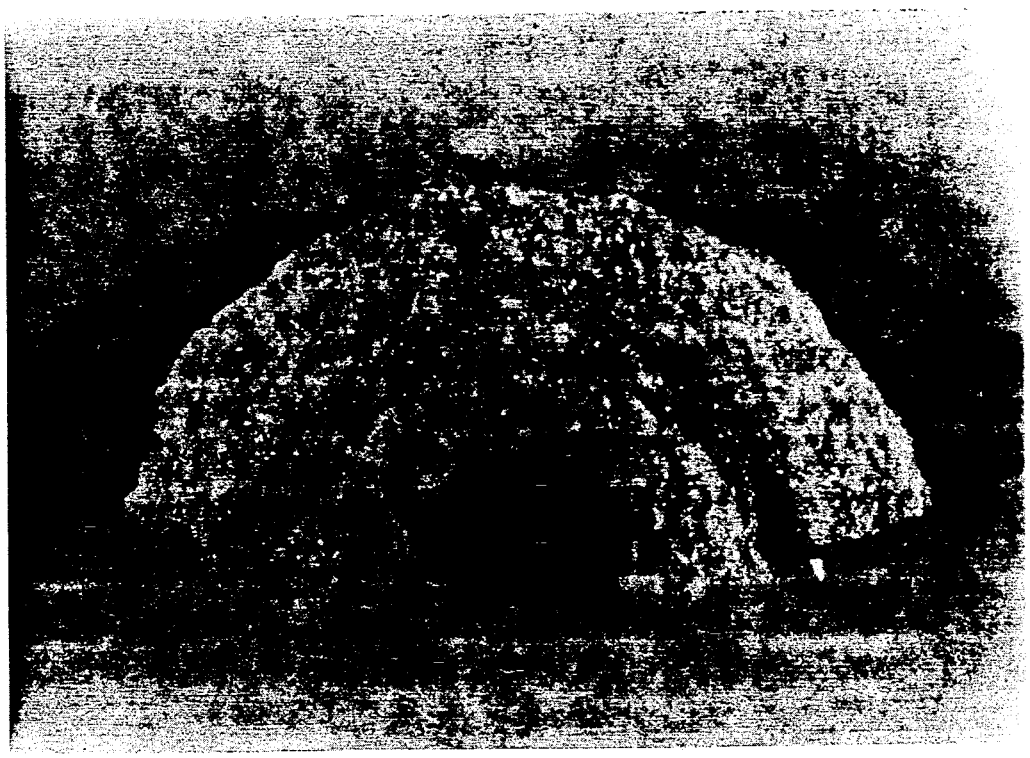
0.5% Sipernat 22    FIG. 2.    (Silicon dioxide)

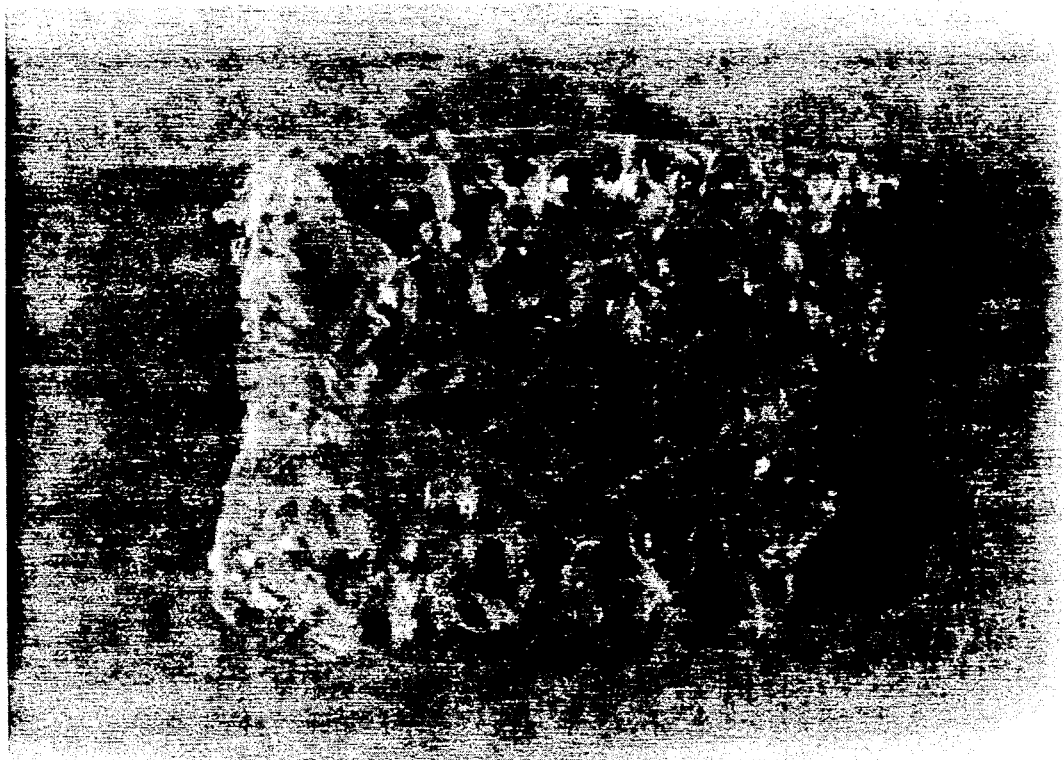
FIG. 3.   5.0% PEGC

STARCH-BASED, BIODEGRADABLE PACKING FILLER AND METHOD OF PREPARING SAME

This application is a division of application Ser. No. 07/822,885, filed Jan. 21, 1992.

BACKGROUND OF THE INVENTION

1. Field of the Invention

The present invention is broadly concerned with expanded, cellular, starch-based extruded products which have compressibility and resiliency properties making them eminently suited for use as packaging fillers or the like, e.g., the well-known "peanuts" used as loose fill packing, or molded packaging components commonly used for protecting electronic components or the like during shipping. More particularly, it is concerned with such extruded products which are improved by provision of a polyalkylene glycol or derivative thereof, and/or a minor amount of a particulate bubble-nucleating agent such as silicon dioxide. Use of these additives gives extrudates having excellent physical properties and desirable uniform, small cells throughout the structure thereof.

2. Description of the Prior Art

Preformed, cellular, high volume, low weight packaging materials formed of polystyrene or similar synthetic resins have for many years been a staple article of commerce. Such products have been produced in a bewildering array of shapes and sizes, depending upon the packaging application in view. While such materials have proven effective for their intended purpose, they are objectionable from an environmental standpoint, in that they persist in the environment for long periods of time. This is especially troublesome because of the large volumes of the products, and the consequent fact that they take up considerable space in landfills.

In response to these concerns, it has been suggested in the past to form biodegradable packaging fillers using starch as a starting material. For example, U.S. Pat. Nos. 4,863,655, 5,035,930 and 5,043,196 describe extruded starch-based fillers made from modified (i.e., hydroxypropylated) high amylose corn starch. A drawback of these products is the relatively high cost of the high amylose starch and the added cost of modifying the starting material. Moreover, these starch-based products do not completely match the desirable properties of prior polystyrene packaging fillers.

SUMMARY OF THE INVENTION

The present invention provides an improved starch product adapted for use as a packaging filler or the like. Broadly speaking, the product comprises an expanded, cellular, compressible and resilient body having a matrix principally made up of starch, but supplemented with a polyalkylene glycol or derivative thereof. This supplement should have an average molecular weight of at least about 1,000, more preferably at least 5,000, and most preferably in the range of about 8,000–25,000.

The preferred polyalkylene glycol products are selected from the group consisting of at least partially hydratable $C_2$-$C_4$ polyalkylene glycols and derivatives thereof (e.g., esters and ethers), and particularly polyethylene glycol, polypropylene glycol, poly(ethyleneoxide), poly(propyleneoxide), poly(butyleneoxide), polyalkylene-acrylate copolymers, polyalkylene glycol adducts to bis-oxirane compounds, and mixtures thereof. Particularly good results have been observed through the use of supplements selected from the group consisting of polyethylene glycol, and polyethylene glycol adducts of bisoxirane-bisphenol A (bisphenol A is the trivial name for 2,2'(methylethyldiene)-1,4-phenyleneoxymethylene).

The glycol supplement should be present in the products at a level of up to about 10% by weight, more preferably from about 10–6% by weight, and most preferably about 3% by weight.

In another aspect of the invention, extruded starch products useful for packaging fillers or the like may be improved by the presence of a minor amount of a bubble-nucleating agent. Thus, the starting starch is supplemented with such an agent, and otherwise normal extrusion is carried out. Use of such a bubble-nucleating agent, either alone or in conjunction with the described glycol supplements, enhances the bulk resiliency properties of the extrudates, and moreover serves to give a more uniform cellular structure thereto.

The preferred bubble-nucleating agents are selected from the group consisting of silicon dioxide, amorphous silicas and mixtures thereof. Particulate charcoal may also be used, but the resultant products would have a grey to black color. The agent should moreover have a particle size of from about 5–100 microns and a surface area of from about 190–450 $m^2/g$. Use of nucleating agents in accordance with the invention should be at a level of from about 0.1–1% by weight, and more preferably about 0.5% by weight.

If it is desired to fabricate loose fill products, advantageous results are obtained when the products are annular in configuration, and even more preferably generally C-shaped in cross-section. Production of extrudates of C-shaped configuration gives enhanced resiliency and is therefore desirable. As indicated previously, however, the products of the invention can be virtually of any shape.

The extruded starch products generally have a bulk density of from about 0.6–2 $lb/ft^3$, and more preferably from about 1.2–1.6 $lb/ft^3$. In addition, the product should have a bulk compressibility of from about 0.04 to 0.4 kilo-newtons, and more preferably from about 0.3–0.36 kilo-newtons. The bulk resiliency of the products hereof should be about 40–75%, more preferably from about 45–70%.

Examination of the extruded products of the invention reveals that they exhibit a large number of closed cells defined by cell walls formed of starch. The cells should have an average diameter of from about 0.5 to 5 mm, and more preferably from about 0.8 to 3 mm. In addition, the cell walls should have a maximum thickness of up to about 0.05 mm.

The products of the invention are most easily fabricated using twin screw extrusion equipment and extrusion conditions typical for the production of expanded starch products. Generally speaking, the starting starch mixture is subjected to preconditioning where moisture is added by means of steam injection such that the starting materials are heated and thoroughly mixed. Thereafter, the preconditioned material is fed to the inlet of a twin screw extruder, where it is subjected to conditions of elevated temperature and pressure and extruded through a restricted orifice die in order to create an expanded, cellular, compressible and resilient extrudate. The glycol polymer and bubble-nucleating agents, either alone or in combination, are preferably mixed with the starch prior to or as a part of the preconditioning operation.

A prime advantage of the present invention is that use can be made of normal wheat starch, and/or unmodified high amylose corn starch, the resulting products are virtually the equal of prior products made using more expensive modified high amylose corn starches. However, starches of the latter character can also be supplemented with the glycol polymer and/or bubble-nucleating agents of the invention and the resultant extrudates may themselves be improved. Furthermore, other types of starch such as potato and tapioca can be employed, although these are not preferred from the standpoint of cost.

BRIEF DESCRIPTION OF THE DRAWINGS

FIG. 1 is an enlarged photographic depiction of an expanded cellular product in accordance with the invention, made from wheat starch supplemented with 3% by weight of a polyethylene glycol adduct of bis-oxiranebisphenol A and 0.5% by weight silicon dioxide;

FIG. 2 is an enlarged photographic depiction of an expanded cellular product, made from wheat starch supplemented with 0.5% by weight silicon dioxide;

FIG. 3 is an enlarged photographic depiction of an expanded cellular product, made from wheat starch supplemented with 5% by weight of a polyethylene glycol adduct of bis-oxirane-bisphenol A;

DETAILED DESCRIPTION OF THE PREFERRED EMBODIMENTS

Figure 4:
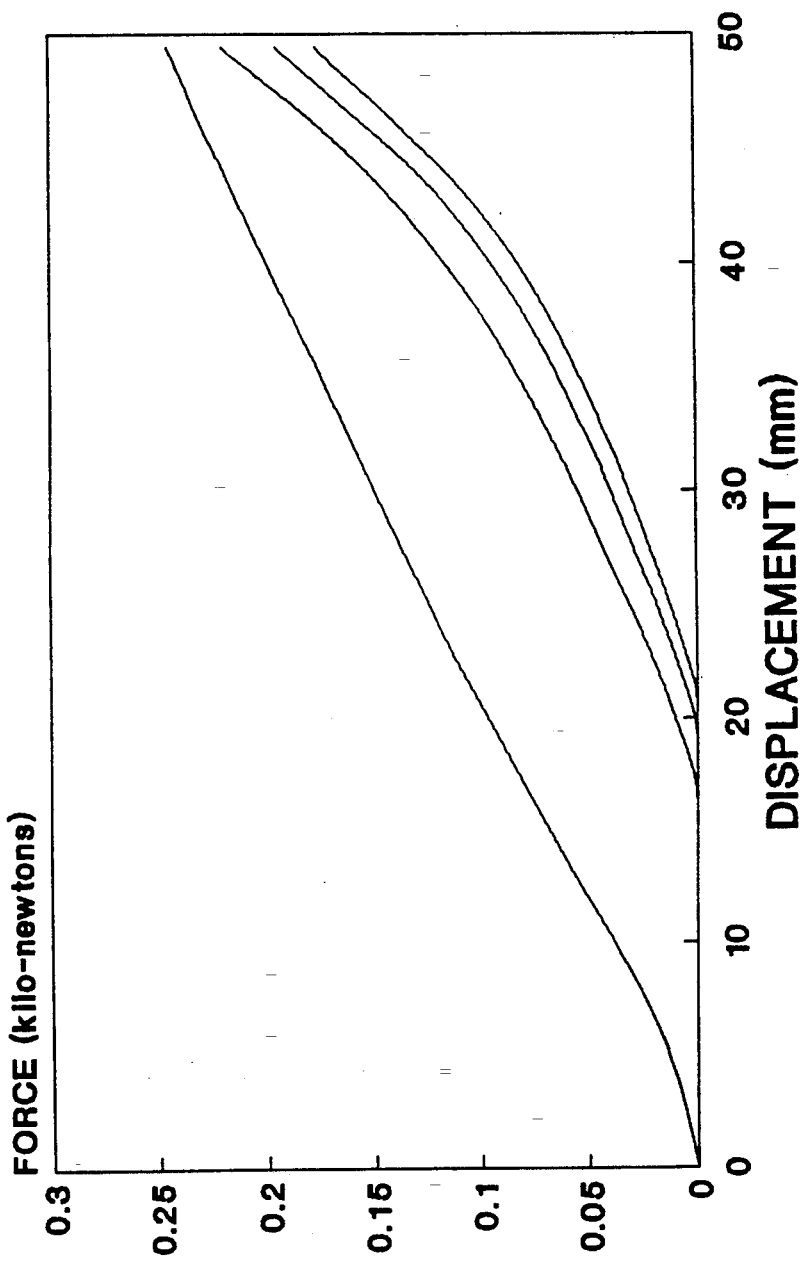
FIG. 4 is a graph depicting the results of a series of compressibility tests carried out on an expanded product made from wheat starch and supplemented with polyethylene glycol and silicon dioxide.

FIGS. 1-3 are photographs of products made in accordance with the present invention. FIG. 1 illustrates the most preferred product, made from wheat starch and supplemented with 3% by weight of the polyethylene glycol adduct of bis-oxirane-bisphenol A having a molecular weight of about 20,000, and 0.5% by weight silicon dioxide. As illustrated, the product exhibits a cellular construction, wherein the cells are predominantly even and of similar size.

FIG. 2 illustrates the use of silicon dioxide alone, and this bubble-nucleating agent has been found to create the desired cell structure described above. However, use of both the glycol and bubble-nucleating agents in combination is preferred, inasmuch as the glycol supplement gives the final product more desirable physical properties, particularly with relatively inexpensive starches such as wheat starch.

FIG. 3 illustrates a product having 5% of the polyethylene glycol derivative as a supplement, without use of silicon dioxide. In this instance, the cells have thin cell walls, but are somewhat larger and not as even as those produced with the silicon dioxide.

Production of the expanded products of the invention is most readily and economically carried out using twin screw extrusion equipment, and particularly that manufactured by Wenger Manufacturing, Inc. of Sabetha, Kansas. Such equipment includes a preconditioner in the form of an elongated chamber equipped with rotatable mixing elements and means for injection of steam and/or water into the interior thereof.

The starting materials (i.e., starch and supplement(s)) are fed to the preconditioner where they are subjected to mixing and elevated temperatures by virtue of steam injection. Desirably, the materials should have a residence time in the preconditioner of from about 1-5 minutes, and more preferably from about 2-3 minutes. The temperature of the materials exiting the preconditioner should be from about 75°-110° C., and more preferably from about 85°-95° C. The product exiting the preconditioner should have a moisture content of from about 11-18% by weight, more preferably about 13-15% by weight.

The preconditioned starting mixture is then fed directly into the inlet of the twin screw extruder. In the extruder, the mixture is subjected to increasing levels of temperature, pressure and shear, and is ultimately extruded through a restricted orifice die. Preferably, the mixture should be heated to a maximum temperature of from about 150°-250° C., and most preferably from about 170°-195° C., in the extruder. Maximum pressures (typically occurring just prior to the extrusion die) should be in the range of from about 500-1,000 psig, more preferably from about 600-800 psig.

As the product emerges from the extrusion die, it is normally cut to convenient lengths, typically through the use of a rotating knife assembly. In the case of loose-fill packing, the length of the product would normally be in the range of from about $\frac{1}{2}$14 4", and more preferably from about 1 to 2$\frac{1}{2}$". No hot air drying or other subsequent product treatment is required, except that the cut extrudate is allowed to cool to ambient temperature.

The preferred polyalkylene glycol supplement is a polyethylene glycol adduct, specifically made by joining two moles of polyethylene glycol, molecular weight of about 6,000-7,000 at each end of a bis-oxirane-bisphenol A moiety. This product is available from Sigma Chemical Co., St. Louis, MO as Product No. 2263; the identical product can be obtained from Union Carbide, Compound 20M.

The preferred bubble-nucleating agent is the Sipernat 22 product commercialized by Degussa Corp., Teterboro, NJ. This product is a spray-dried silica with high absorptivity and relatively large particle size. It is conventionally used for the conversion of liquids into powders, e.g., in the animal feed industry as a carrier for choline chloride solution. Another similar product which finds utility in the invention is the Sipernat 50 product commercialized by the same manufacturer. These Sipernat products are described in a bulletin distributed by the manufacturer entitled "Precipitated Silicas and Silicates"; this bulletin is incorporated by reference herein.

The following examples illustrate the production of extruded starch-based products in accordance with the invention. It should be understood that the examples are presented by way of illustration only, and nothing therein should be taken as a limitation upon the overall scope of the invention.

EXAMPLE 1

In this example, two starch formulas were prepared and extruded to form a light-weight, resilient packing material. Formula ·1 was made up of 96.5% by weight of normal wheat starch (Midsol 50, Midwest Grain Products, Atchison, Kansas), 3% by weight polyethylene glycol product having a molecular weight of about 20,000 (Compound 20M, Union Carbide) and 0.5% by weight silicon dioxide (Sipernat 22, Degussa Corporation, Teterboro, NJ). Formula #2 was identical, except that high amylose corn starch (Hylon VII, National Starch Company, Bridgewater, NJ) was used in place of the wheat starch.

The extrusion equipment included a conventional preconditioner configured for relatively long retention times (2-3 min.) and injection of steam into the dry materials during preconditioning. The output from the preconditioner was fed to the inlet of a Model TX52 extruder commercialized by Wenger Manufacturing, Inc. of Sabetha, Kansas. The extruder was equipped with a total of six heads, with heads 2-6 being jacketed for the introduction of heat exchange media in order to indirectly heat or cool the material passing through the extruder. The media included water flow controlled by a solenoid valve linked to a thermostat to maintain a constant preset temperature for the head (W/temp.) and thermostatically controlled hot oil (HO/temp.). No water or steam was added directly to the material passing through the barrel. The internal screw of the extruder was equipped with three sets of spaced kneading block elements, one set of round steam locks, and final, triple-flighted conical screws adjacent the die. The outlet end of the extruder was equipped with a back-up die that converged the material flow from the twin screws into a single material stream, and a final die containing two inserts with annular openings.

Figure 7:
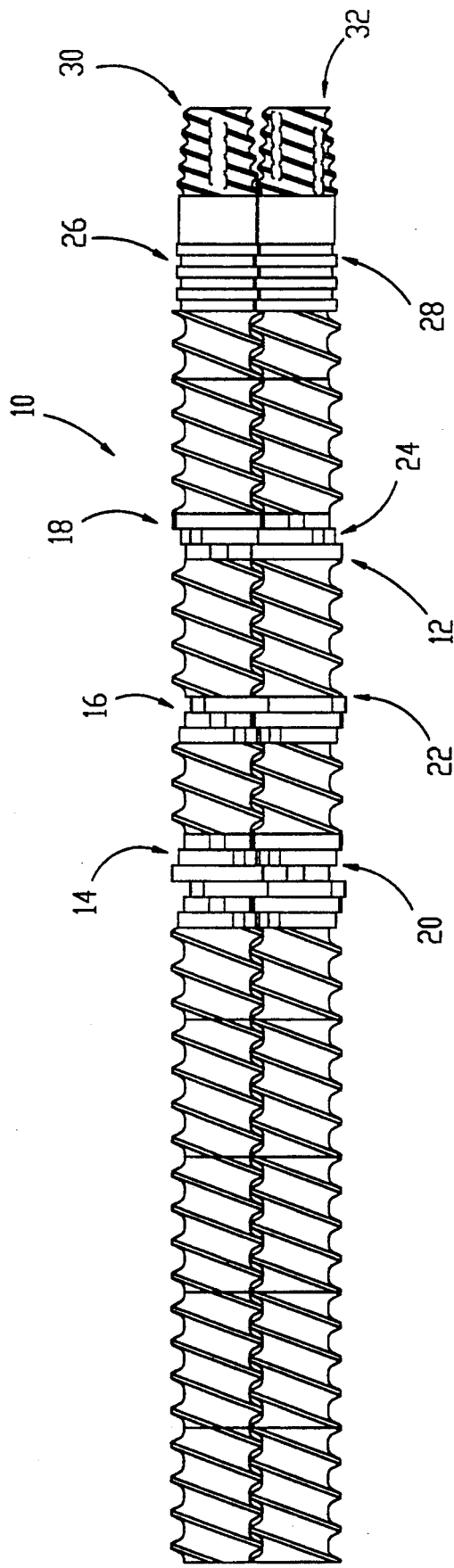
FIG. 7 is a view illustrating the configuration of the co-rotating twin screws used in the preferred apparatus for producing the expanded product of the invention.

In particular, the extruder heads included an inlet head (Wenger Part No. 55316-001) and jacketed downstream heads 2-6 (Wenger Parts Nos. 55307-001 [heads 2-5] and 55319-001 [head 6]). The internal twin screw configuration was as depicted in FIG. 7 to include co-rotating twin screws 10, 12 having three ganged sets of block elements 14-18 and 20-24 interposed therein. Each screw further includes a set of steamlocks 26, 28 and a cut flight, conical nose screw 30, 32.

The final die included a back-up die plate (Wenger Part No. 55361-001), a final die plate (Wenger Part No. 55372-113), with the latter having a pair of annular die inserts (for Run #1, the annular opening dimensions were: outer diameter 5.75 mm, pin diameter 3.15 mm and an open area of 18.17 mm$^2$; for run #2, the annular opening dimensions were: outer diameter 7.94 mm, pin diameter 6.35 mm and open area of 17.85 mm$^2$).

A rotating knife was used to cut the extrudate as it emerged from the die to present product pieces having a length of 1.75 inches.

In carrying out these experiments, the ingredients were first mixed and then fed to the preconditioner where steam was injected and complete mixing occurred. The residence time in the preconditioner was estimated to be on the order of 2-3 minutes. The temperature of the product was raised to approximately 85°-95° C. in the preconditioner, and the moisture content of the product leaving the preconditioner was about 14% (moisture content, wet basis).

During passage of the material through the extruder, the temperature thereof was elevated and the mixture was subjected to increased pressures. The screw and die configuration in the extruder was set up to maximize alignment of the starch molecules during extrusion. This was accomplished in the screw configuration by using a 39 mm length of round steam locks just prior to the high-shear conical screw elements at the discharge end of the extruder. In this fashion, the conveying screw elements just prior to the non-conveying steamlocks, served to "pump" the molten starch pass the steamlocks and the poorly conveying high-shear cone screws and into the die assembly. The limited conveying and mixing characteristics of this section of the extruder resulted in shearing action predominantly in the direction of flow. In the first back-up die, the material flowed from the twin screws and was converged into a single stream prior to the final die. As the molten starch left the back-up die, it was sheeted out into a thin layer (2 mm) and traveled radially to two final die inserts having annular openings. The starch material flowing through the annular openings expanded to form a light-weight hollow tube. The laminar shear fields occurring in the die assembly resulted from viscous drag forces and helped to further align the starch molecules. The use of the annular die opening provided a laminar flow shear field at the discharge of the extruder that also helped to maintain the alignment of the starch molecules during expansion. The annular die also functioned to lower the bulk density of the product due to the final shape thereof.

The preconditioning and extrusion conditions for these runs are set forth in the following table:

|  | Run No. 1 | Run No. 2 |
| --- | --- | --- |
| RAW MATERIALS |  |  |
| Rate (lbs/hr) | 102.0 | 102.0 |
| Screw Speed (RPM) | 12.8 | 12.8 |
| PRECONDITIONING |  |  |
| Mixing Cyl. Speed (RPM) | 120.0 | 207.0 |
| Steam Flow (lbs/hr) | 4.2 | 5.5 |
| Discharge Temp. (°C.) | 82.0 | — |
| Discharge Moisture (%) | 13.5 | — |
| EXTRUSION |  |  |
| Shaft Speed (RPM) | 370.0 | 410.0 |
| Motor Load (%) | 32.0 | 32.0 |
| BARREL ZONE TEMPERATURES (°C.) |  |  |
| 2nd Head (CW)[1] | 93.0 | 34.0 |
| 3rd Head (CW) | 93.0 | 34.0 |
| 4th Head (HO)[2] | 177.0 | 150.0 |
| 5th Head (HO) | 174.0 | 174.0 |
| 6th Head (CW) | 166.0 | 140.0 |
| Die | 186.0 | 128.0 |
| PRESSURE (psig) |  |  |
| 6th Head | 600.0 | 600.0 |
| Die | 800.0 | 800.0 |
| Knife Drive Speed | 21.0 | 15.0 |
| PRODUCT INFORMATION |  |  |
| Extrudate Moisture | 8.2 | — |
| PRODUCTION RATE (LBS/HR) |  |  |
| Wet Basis | 120.0 | — |

[1] CW = cold water directed through external head jacket to provide indirect cooling.
[2] HO = hot oil directed through external head jacket to provide indirect heating.

EXAMPLE 2

A number of starch-based extruded products were produced using the Wenger TX52 extrusion equipment and die(s) described below. In all cases, the extrusion conditions were on the order of those set forth in Example 3 within normal experimental limits and taking into account the different starch materials being extruded. The resultant extrudates were then tested to determine bulk compressibility, bulk resiliency, generation of fines upon compression, axial fault lines, bulk density, and sectional, longitudinal and volumetric expansion indices.

In the use of annular dies as described in connection with Example a problem was experienced because of the development of axial fault lines in the extrudate. These fault lines resulted from the convergent starch flow around the three radially projecting retaining pins which held the center pin of the annular die insert. As the starch melt traveled around the retaining pins, the convergent flows welded together but weak fault lines were created in the extrudate. These axial fault lines fractured easily under pressure even though the main body of the extrudate was relatively strong, compressible and resilient. In order to overcome this problem, a new die design was created. Instead of having a completely annular opening, the improved die had a "C" shaped opening. This design eliminated the need for retaining pins, but still provided a laminar flow shear field at the discharge of the extruder. Additionally, the land length of the die was increased substantially to help provide better alignment of the starch molecules within the shear field. Expansion of the product as it left the die almost closed the C-shaped product, such that the product was effectively annular.

In the tests herein described, three dies were used, namely the "small tube", "large tube" and "C-shaped." The small and large tube dies were conventional annular dies, whereas the C-shaped die was as described immediately above. The small tube die was used in the Example 1 experiments, and its dimensions have been described. The large tube die had an outer diameter of 7.94 mm, and inner diameter of 6.35 mm, and an open area of 17.85 mm². The C-shaped die had an outer diameter of 7.00 mm, an inner diameter of 5.00, an open area of 15.71 mm², and an unclosed circle distance of approximately 3 mm.

The bulk compressibility of a sample, i.e., the maximum force required to compress the sample to two-thirds of its original volume, was determined as follows. The sample was randomly loaded in a cylindrical container having an inside diameter of 125 mm to a height of 150 mm. The sample weight was then recorded. A plunger moving at 25 mm/min. was used to compress the sample down to a height of 100 mm, and the force required for compression was continuously recorded. Maximum compression force was always observed at the maximum displacement (see FIGS. 4-6). A high value represents a sample that is relatively hard, i.e., less compressible, and requires application of more force to reduces its volume, as compared with a more compressible sample having a lower value of force required to change its volume by the same amount.

Figure 5:
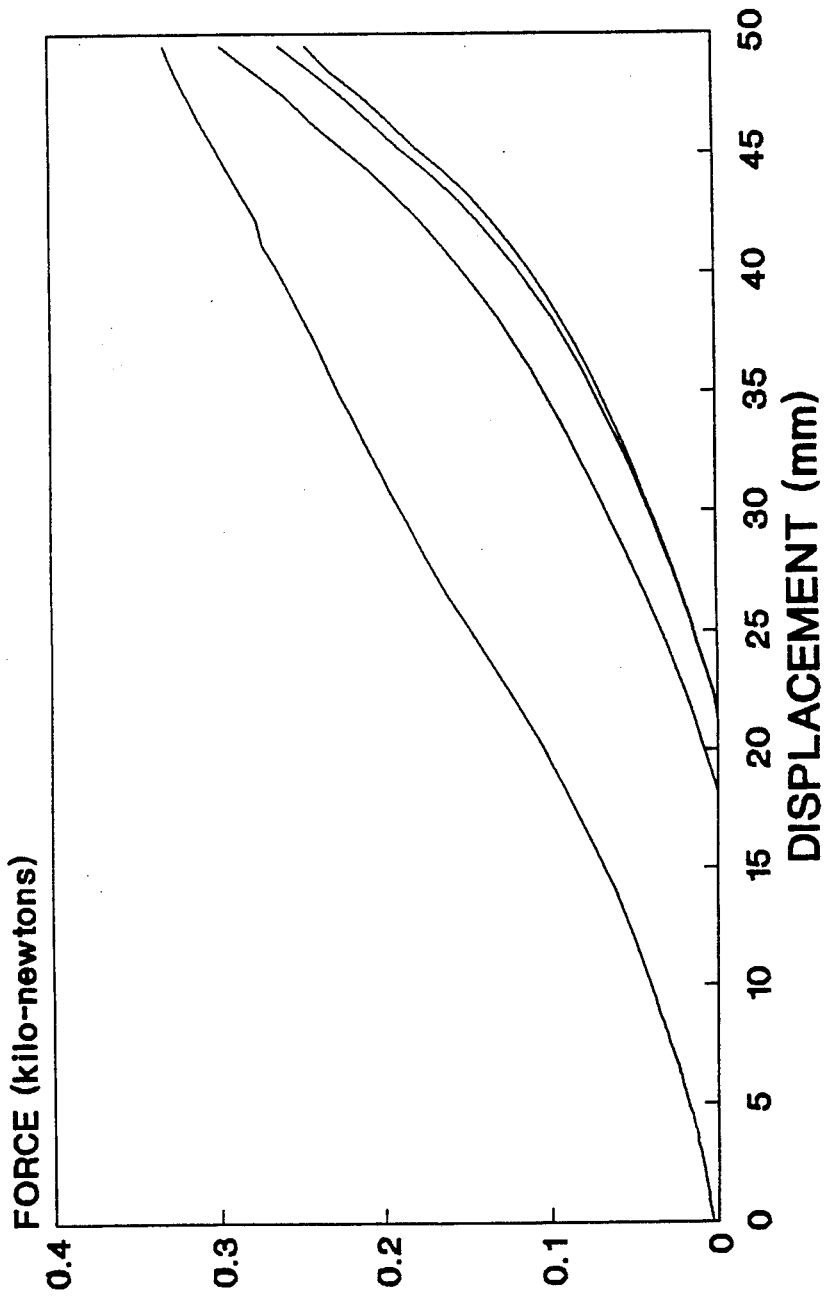
FIG. 5 is a graph similar to that of FIG. 4 but showing the test results obtained using an expanded product made from hydroxypropylated wheat starch supplemented with a derivative of polyethylene glycol and silicon dioxide.
Figure 6:
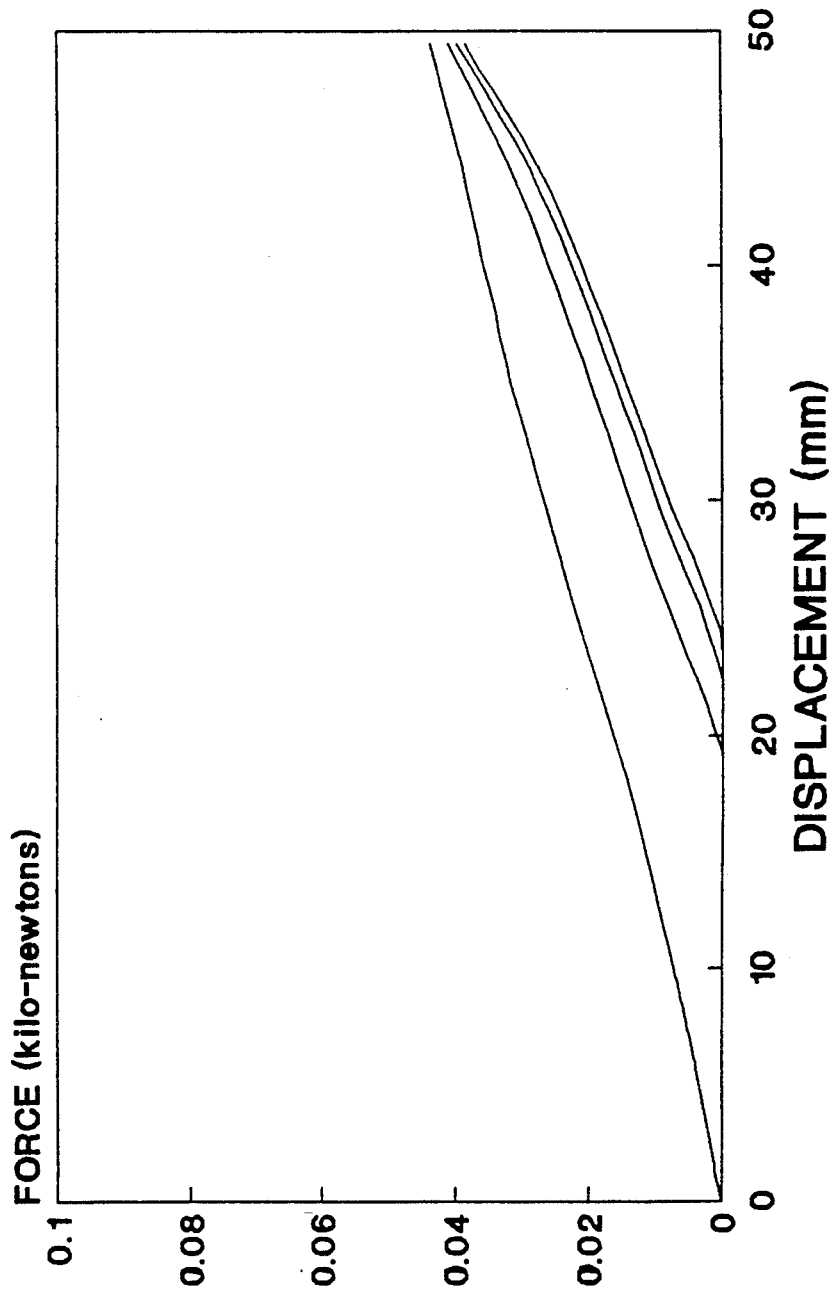
FIG. 6 is a graph similar to that of FIG. 4, but illustrating compressibility results obtained using an expanded product made from high amylose corn starch supplemented with a derivative of polyethylene glycol and silicon dioxide.

Following the initial bulk compressibility determination, the plunger was returned to its original position and held there for one minute before the next compression to the 100 mm height. These compression tests were repeated for 5-7 cycles. Force versus displacement results were recorded and corresponding graphs prepared. FIGS. 4-6 are representative graphs of this type, for the preferred product in accordance with the invention (FIG. 4), modified wheat starch (FIG. 5) and high amylose corn starch (FIG. 6).

Bulk resiliency refers to the degree that a sample is able to recover to its original volume after the determination of bulk compressibility. Bulk resiliency is defined as the percent recovery of the sample determined by dividing the recovered volume of the sample by the displacement volume of the plunger. This was conveniently calculated from the second compression cycle by subtracting the distance that the plunger traveled before making contact with the sample from the total displacement distance (50 mm), and dividing the difference by the total displacement distance. The result is expressed as a percentage by multiplying by 100. A higher percent recovery corresponds to a sample that has better bulk resiliency.

Fines and axial fault lines were determined qualitatively by observing the number of fines generated from the compressibility tests, and from an examination of the samples after such compressions.

Bulk density was determined by filling a one liter volume container to level full capacity with product, weighing it in grams and converting it to lbs/ft³ (factor: 0.0624). Ten measurements were taken without replacement for each sample. Sectional, longitudinal, and volumetric expansion indices developed by Alvarez-Martinez, et al. (1988, J. Food Sci. 53:609) were used to characterize expansion of the extruded products. Sectional Expansion Index (SEI) is a measure of radial expansion of the extrudate and is the ratio of the cross-sectional area of the extrudate to the cross-sectional area of the die. Longitudinal Expansion Index (LEI) is a measure of expansion in the axial direction and is described by the following equation:

$$LEI = [A_{die} L_{se}] \rho_d [(1-MC_d)/(1-MC_e)]$$

where $A_{die}$ is the open area of the die in square meters, $L_{se}$ is the specific length of the extrudate in m/kg, $\rho_d$ is the density of the dough behind the die (assumed to be constant and equal to 1,200 kg/m³), and $MC_d$ and $MC_e$ are the moisture contents of the dough and extrudate, respectively. Volumetric Expansion Index (VEI) takes into account SEI and LEI to describe the expansion on a volumetric basis (VEI=SEI×LEI). Ten pieces from each treatment were measured for each expansion index.

Two commercial packing fills, namely a starch-based material made using high amylose corn starch and an expanded polystyrene product, were also tested in order to provide a comparison with the products of the present invention.

The results of these characterizing tests are set forth in the following table:

| RUN # | STARCH ADDITIVES/DIE | BULK COMPRESSIBILITY (kilo-newtons) | BULK RESILIENCY % | FINES[1] | AXIAL FAULT LINES[1] | BULK DENSITY (lbs/ft³, Avg) | SEI Avg. | LEI Avg. | VEI Avg. |
|---|---|---|---|---|---|---|---|---|---|
| 1 | Wheat Starch/No Additives/Small Tube | 0.273 | 55.3 | +++ | + | 1.48 | 12.61 | 1.69 | 21.27 |
| 2 | Wheat Starch/0.5% Silicon Dioxide/Small Tube | 0.356 | 56.8 | +++ | + | 1.69 | 12.48 | 1.64 | 19.81 |
| 3 | Wheat Starch/5.0% | 0.146 | 53.3 | +++ | + | 1.10 | 24.25 | 1.76 | 42.43 |

-continued

| RUN # | STARCH ADDITIVES/DIE | BULK COMPRESSIBILITY (kilo-newtons) | BULK RESILIENCY % | FINES[1] | AXIAL FAULT LINES[1] | BULK DENSITY (lbs/ft$^3$, Avg) | SEI Avg. | LEI Avg. | VEI Avg. |
|---|---|---|---|---|---|---|---|---|---|
|  | PEGC[2], m.w. 20,000/Small Tube |  |  |  |  |  |  |  |  |
| 4 | Wheat Starch/3.0% PEGC, m.w. 20,000 0.5% Silicon Dioxide/Small Tube | 0.223 | 50.0 | + | +++ | 1.33 | 9.45 | 2.55 | 24.04 |
| 5 | Wheat Starch/6.0% PEGC, m.w. 20,000 0.5% Silicon Dioxide/Small Tube | 0.203 | 48.4 | ++ | ++ | 1.36 | 16.90 | 1.59 | 26.72 |
| 6 | Wheat Starch/3.0% PEG[3], m.w. 10,000 0.5% Silicon Dioxide/Small Tube | 0.205 | 55.4 | + | ++ | 1.37 | 18.01 | 1.59 | 28.51 |
| 7 | Hydroxypropylated Wheat Starch/3.0% PEGC, m.w. 20,000 0.5% Silicon Dioxide/Small Tube | 0.331 | 61.6 | ++ | ++ | 1.75 | 13.96 | 1.65 | 22.91 |
| 8 | Wheat Starch/3.0% PEGC, m.w. 20,000 0.5% Silicon Dioxide/Large Tube | 0.179 | 67.9 | + | ++ | 1.24 | 16.38 | 1.85 | 30.28 |
| 9 | Wheat starch/6.0% PEGC, m.w. 20,000 1.0% Silicon Dioxide/Large Tube | ...0.183 | 69.9 | + | ++ | 1.22 | 20.79 | 1.58 | 32.67 |
| 10 | Wheat Starch/3.0% PEG, m.w. 10,000 0.5% Silicon Dioxide/"C" Shape S' 3 Opening | 0.245 | 65.8 | + | − | 1.36 | 20.10 | 1.31 | 26.01 |
| 11 | Wheat Starch/6.0% PEGC, m.w. 20,000 1.0% Silicon Dioxide/"C" Shaped Die Opening | 0.227 | 59.5 | ++ | − | 1.08 | 33.79 | 1.01 | 33.98 |
| 12 | Corn Starch/3.0% PEGC, m.w. 20,000 0.5% Silicon Dioxide/Large Tube | 0.239 | 34.4 | +++ | + | 1.67 | 18.54 | 1.04 | 19.33 |
| 13 | High Amylose Corn Starch[4]/No Additives/Large Tube | 0.140 | 69.9 | + | ++ | 0.88 | 18.87 | 2.58 | 48.22 |
| 14 | High Amylose Corn Starch/3.0% PEGC, m.w. 20,000 0.5% Silicon Dioxide/Large Tube | 0.044 | 59.4 | + | + | 0.61 | 22.12 | 2.68 | 58.80 |
| 15 | Commercial Starch Foam Protective Loose-Fill | 0.137 | 57.5 | + | + | 1.07 | *** | *** | *** |
| 16 | Commercial Polystyrene Protective Loose-Fill | 0.198 | 67.6 | + | − | 0.26 | *** | *** | *** |

[1] "+" low level; "++" moderate level; "+++" high level; "−" absent
[2] Polyethylene glycol compound: 2 moles of polyethylene glycol (m.w. 6,000-7,000) reacted with an epoxide (bis-oxirane-bisphenol A) to yield PEGC with a molecular weight range of 15,000-20,000
[3] Polyethylene glycol with an average molecular weight of 10,000
[4] Hylon VII, 70% amylose This series of tests demonstrates that a preferred product of the invention containing 3% PEGC and 0.5% silicon dioxide (Run #8) was very similar in bulk compressibility and resiliency to the commercial polystyrene product. It is believed that the effect of PEGC on the longitudinal expansion of the product is responsible for the superior compressibility and resiliency of the Run #8 product. Expansion in the longitudinal direction can be related to improved alignment of the starch molecules in the direction of extrusion. This alignment gives a strong retarding effect to expansion in the radial direction due to less resistance for the escape of steam and gases in the longitudinal direction, resulting in greater LEI. Structurally, this alignment gives the extrudate improved tensile strength, flexibility and resiliency.

Although the mechanism by which PEGC facilitates this alignment is not fully understood, it is believed that the PEGC may form inclusion complexes with the amylose causing the molecule to have an elongated conformation. The more extended conformation would account for expansion in the longitudinal direction when the attractive forces between polymer molecules are not as strong as primary bonds along the polymer backbone. The alignment of linear molecules accounts for the flexibility and resilience of the extruded product. However, addition of PEGC at levels greater than about 3% in the presence of 0.5% silicon dioxide results in increased SEI at the expense of LEI. It is believed that the extra PEGC above that required to complex amylose gives an excessive plasticizing effect, which tends to weaken the interactive forces between starch molecules and consequently lowers the resistance for the escape of steam and gases in the radial direction, resulting in greater SEI.

The use of PEG having a molecular weight of half that of PEGC produces effects on expansion and bulk density which are roughly equivalent to that caused by 6% concentration of PEGC. These results suggest that the concentration-dependent effects of PEG are more dependent on the molar quantity and not as much on the mass quantity. Moreover, these studies indicate that polyalkylene glycols and their derivatives having a molecular weight of at least about 1,000 will give beneficial effects.

The table also demonstrates that products derived from modified (e.g., hydroxypropylated) starches and high amylose starches can be improved through use of the additives of the present invention.

I claim:

1. A starch product adapted for use as a packaging filler or the like, said product comprising an expanded, cellular, compressible and resilient body having a matrix principally comprising starch supplemented with a polyalkylene glycol or derivative thereof.

2. The starch product of claim 1, said polyalkylene glycol or derivative thereof having an average molecular weight of at least about 1,000.

3. The starch product of claim 1, said starch being selected from the group consisting of modified and unmodified wheat and corn starches.

4. The starch product of claim 3, said starch being selected from the group consisting of wheat and high amylose corn starches.

5. The starch product of claim 1, said polyalkylene glyol or derivative thereof being selected from the group consisting of polyethylene glycol, polypropylene glycol, polyalkylene-acrylate copolymers, adducts of polyalkylene glycols with epoxide derivatives, and mixtures thereof.

6. The starch product of claim 5, said polyalkylene glycol or derivative thereof being selected from the group consisting of polyethylene glycol having an average molecular weight of at least about 5,000, and polyethylene glycol adducts of bis-oxirane-bisphenol A.

7. The starch product of claim 1, said polyalkylene glycol or derivative thereof being present at a level of up to about 10% by weight.

8. The starch product of claim 7, said level being from about 1-6% by weight.

9. The starch product of claim 8 said level being about 3% by weight.

10. The starch product of claim 1, said starch matrix also being supplemented with a minor amount of a bubble-nucleating agent.

11. The starch product of claim 10, said agent being selected from the group consisting of silicon dioxide and amorphous silicas and mixtures thereof.

12. The starch product of claim 10, said agent being in particulate form and having a particle size of from about 5-100 microns and a surface area of from about 190-450 $m^2/g$.

13. The starch product of claim 10, said agent being present at a level of from about 0.1-1% by weight.

14. The starch product of claim 13, said level being about 0.5% by weight.

15. The starch product of claim 1, said product being annular.

16. The starch product of claim 1, said product being generally C-shaped in cross-section.

17. The starch product of claim 1, said product having a bulk density of from about 0.6-2 $lb/ft^3$.

18. The starch product of claim 17, said bulk density being from about 1.2-1.6 $lb/ft^3$.

19. The starch product of claim 1, said product having a bulk compressibility of from about 0.04 to 0.4 kilo-newtons.

20. The starch product of claim 19, said compressibility being from about 0.13-0.36 kilo-newtons.

21. The starch product of claim 1, said product having a bulk resiliency of from about 40-75%.

22. The starch product of claim 21, said resiliency being from about 45-70%.

23. The starch product of claim 1, said product presenting cells having an average diameter of from about 0.5 to 5 mm.

* * * * *

UNITED STATES PATENT AND TRADEMARK OFFICE
CERTIFICATE OF CORRECTION

PATENT NO.    :   5,185,382

DATED         :   February 9, 1993

INVENTOR(S)   :   Paul E. Neumann and Paul E. Seib

It is certified that error appears in the above-identified patent and that said Letters Patent is hereby corrected as shown below:

At col. 4, line 37, please correct "1/2 14 4" to read "1/2-4".

Signed and Sealed this

Twenty-third Day of November, 1993

Attest:

BRUCE LEHMAN

Attesting Officer    Commissioner of Patents and Trademarks